Patented Jan. 9, 1951

2,537,646

UNITED STATES PATENT OFFICE 2,537,646

ANTICORROSIVE TREATMENT OF CHLORINATED ELASTOMER

Elizabeth M. Behrend, Pittsburgh, Pa., assignor to The Firestone Tire & Rubber Company, Akron, Ohio, a corporation of Ohio No Drawing. Application January 25, 1949, Serial No. 72,761

11 Claims. (Cl. 260—94.7)

This invention relates to a process of treating chlorinated natural and synthetic elastomers to render solutions thereof non-corrosive toward ferrous and other metals, and also relates to the chlorinated elastomers so treated.

Enamels, paints, lacquers and similar liquid coating compositions containing chlorinated elastomers are highly corrosive toward the sheet steel containers in which they are packaged, stored and shipped. Likewise, the solutions of chlorinated elastomers involved in the process of manufacture of the chlorinated elastomers tend to corrode the metal equipment in which they are processed. This corrosive action can be reduced by incorporating antiacid substances in the solutions; however, the antiacids are soon exhausted, and the residues thereof actually accelerate the corrosion which then sets in.

Accordingly, it is an object of this invention to prevent the corrosive action of chlorinated elastomers upon ferrous metals.

Another object is to provide chlorinated elastomer products which are inherently non-corrosive toward ferrous metals, and which do not depend upon the continued presence of antiacid substances for such non-corrosive properties.

A further object is to provide a process for treating chlorinated elastomers to render the same inherently non-corrosive, which process may be carried out expeditiously, with simple equipment, and with a minimum of skilled supervision.

SYNOPSIS OF THE INVENTION

The above and other objects are secured, in accordance with this invention, by incorporating, into 1000 parts (all parts mentioned in this specification are by weight) of a solution of a chlorinated elastomer, the following ingredients, in at least the minimum proportions indicated.

Table A

| | |
|---|---|
| Maleic anhydride, 1 part | these quantities are to be multiplied by a factor F, given in Table B below |
| Lower alkyl ketone, 4 parts | |
| Borax, 1 part | | and thereafter permitting the solution to stand at from 25° C. to 95° C. for from 2 to 24 hours. The resultant solution has negligible corrosive action upon ferrous and other metals. This property carries over into other solutions made from the chlorinated elastomer after its isolation from the original treated solution. For example, assuming the process is applied to a solution of chlorinated rubber in carbon tetrachloride as it comes from the chlorination process; if the chlorinated rubber is precipitated from the solution, dried, and redissolved in a commercial hydrocarbon solvent, the resultant solution will have only negligible corrosive action upon ferrous metals, even though any free maleic anhydride, ketone, borax, etc. will have been separated from the chlorinated rubber in the solution.

As noted above, the minimum amounts of the treating agents to be used must be multiplied by a factor F, which is a function of the time and temperature at which the solution is kept. This function may be set forth tabularly as follows.

Table B

| Temperature of Treatment (°C.) | Time of treatment (hours) | | | | | |
|---|---|---|---|---|---|---|
| | 2–4 | 4–6 | 6–12 | 12–18 | 18–24 | 24 or more |
| 25°–50° | 10.0 | 6.0 | 5.0 | 4.5 | 4.0 | 3.5 |
| 50°–65° | 3.0 | 2.5 | 2.5 | 2.0 | 2.0 | 2.5 |
| 65°–75° | 1.8 | 1.5 | 1.0 | 1.0 | 1.0 | 1.0 |
| 75°–85° | 1.2 | 1.0 | 1.0 | 0.8 | 0.8 | 0.7 |
| 85°–90° | 1.0 | 0.9 | 0.9 | 0.8 | 0.7 | 0.7 |

The values of F are set forth in the body of the table, the figure in any box being the factor F to be used when the time of treatment is as indicated at the head of the column in which box appears and the temperature of treatment is as indicated to the left of the row in which the box appears.

THE CHLORINATED ELASTOMERS

Referring first to the chlorinated elastomers, these constitute a well-known class of materials, of which chlorinated rubber is the prototype. Chlorinated natural rubber is produced by dissolving natural rubber in a suitable chlorine-resistant solvent such as carbon tetrachloride and introducing chlorine until the rubber has combined with about 66% of chlorine. The resultant product is a resin which has come into wide use as an ingredient in anti-corrosion paints, alkali-resistant paints such as concrete paints, hardening agents for glyptal varnishes and enamels, etc. With the advent of the synthetic rubbery polymers and copolymers of butadiene and of isoprene, chlorinated products closely similar to chlorinated rubber have been produced by chlorinating these synthetic materials in a similar manner. Generally the synthetic polymeric materials which have been found susceptible to chlorination in the manner described are simple polymers of unmixed butadiene; copolymers of butadiene with other extraneous unsaturated compounds copolymerizable therewith, said copolymers containing at least 65% of butadiene copolymerized therein; simple polymers of unmixed isoprene; copolymers of isoprene with other extraneous unsaturated compounds copolymerizable therewith, said copolymers containing at least 65% of isoprene copolymerized therein; copolymers of butadiene with isoprene; and copolymers of butadiene with isoprene together with other extraneous unsaturated compounds copolymerizable therewith, the total weight of butadiene and isoprene copolymerized in said copolymers being at least 65%. It will be seen that the essential feature of all of these natural and synthetic polymers which are subject to chlorination is that polymeric chains shall consist essentially of the polymeric butadiene and isoprene structure, which structure constitutes at least 65% of the entirety of the individual chains, which may be interspersed with not more than 35% of the residues of the extraneous unsaturated compounds (if any) copolymerized therein. The extraneous unsaturated compounds which may be copolymerized, as above noted, with butadiene and isoprene to yield rubbery materials are a well-known class of ethylenically unsaturated compounds exemplified in monounsaturated compounds such as vinyl compounds on the order of styrene, vinyl chloride, vinyl esters such as vinyl acetate, vinyl chloroacetate, vinyl butyrate and the like, vinyl ethers such as vinyl methyl ether, vinyl ethyl ether, vinyl isopropyl ether and the like, vinyl ketones such as vinyl methyl ketone and methyl isopropenyl ketone and the like, and vinyl cyclic compounds such as vinyl pyridine, vinyl carbazole and the like; acrylic derivatives such as acrylic and methacrylic acids, nitriles, amides and esters on the order of acrylic acid, methacrylic acid, acrylonitrile, methacrylonitrile, acrylamide, methyl methacrylate, ethyl acrylate, ethyl α-chloroacrylate and the like; α-β unsaturated α-β dicarboxylic acid and derivatives such as maleic acid, fumaric acid, diethyl maleate, diethyl fumarate, β-cyano acrylic acid and the like; and vinylidene compounds such as vinylidene chloride, bromo-chloride and the like. Likewise there may be employed doubly unsaturated compounds in which the unsaturated bonds are conjugated, such as 2,3-dimethyl-butadiene-1,3, chloroprene, piperylene, 2-cyano-butadiene-1,3 and the like. For a more complete list of compounds which are copolymerizable with butadiene and with isoprene, reference is made to Krczil "Kurzes Handbuch der Polymerisationstechnik II Mehrstoffpolymerisation," pp. 655 and 656, the items under "Butadiene," and p. 682, the items under "Isoprene." The chlorinated elastomers to which the present invention is applicable may be summarized as follows:

*Table C*

CHLORINATED ELASTOMERS

1. Chlorinated natural rubber.
2. Chlorinated polybutadiene.
3. Chlorinated copolymers of butadiene with other unsaturated compounds copolymerizable therewith, said copolymers containing at least 65% of butadiene copolymerized therein.
4. Chlorinated polyisoprene.
5. Chlorinated copolymers of isoprene with other unsaturated compounds copolymerizable therewith, said copolymers containing at least 65% of isoprene copolymerized therein.
6. Chlorinated copolymers exclusively of butadiene with isoprene containing less than 65% of butadiene and less than 65% of isoprene copolymerized therein.
7. Chlorinated copolymers of butadiene with isoprene together with other compounds copolymerizable therewith, said copolymers containing a total of at least 65% of butadiene and isoprene copolymerized therein and containing less than 65% of butadiene and less than 65% of isoprene copolymerized therein.

THE SOLUTIONS TREATED

The practice of this invention may conveniently be applied in the course of the manufacturing process to the solutions of chlorinated elastomers after they emerge from the chlorination step. These will usually be solutions of the chlorinated elastomers in carbon tetrachloride, ethylene dichloride or other chlorinated solvent, and will usually contain from about 2% to about 15% of the chlorinated elastomer. The concentration is not critical, and it has been found empirically that the amount of treating agents to be employed should be based on the total weight of solution as above described, independently of the amount and concentration of the chlorinated elastomer. Alternatively the invention may be practiced upon solutions made up from chlorinated elastomers which have been separated from the solvents employed in their chlorination. The solutions treated may contain from 2% to 30% of chlorinated elastomer, and may be dissolved in any solvents in which chlorinated elastomer is soluble, such as chlorinated solvents on the order of carbon tetrachloride, chloroform, ethylene dichloride, dichloroethylene and the like; hydrocarbon solvents such as petroleum ether, benzene, toluene, xylene, hexane, solvent naphtha and the like; ester solvents such as ethyl acetate, ethyl butyrate, etc.; Cellosolve-type solvents; nitroparaffins; and ketone solvents such as acetone, methy ethyl ketone, methyl isopropyl ketone, etc. In those cases where the ketones are employed as solvents, they will also serve as the ketone treating agent, which therefore need not be specially supplied.

As noted above, the process of this invention may conveniently be applied to the solutions of chlorinated elastomers immediately following the chlorination step. In such case the resultant solution will be much less corrosive to apparatus employed in subsequent stages of the manufacturing process. The solutions treated are subjected to the usual purification and precipitation steps to isolate the chlorinated elastomer. These purification and precipitation steps usually comprise injecting the solution into hot water to flash off the solvent, or adding methanol or other non-solvent to the solution to cause precipitation of the chlorinated elastomer. Both of these treatments still further enhance the already excellent non-corrosive properties of the chlorinated elastomers which have been treated in accordance with this invention; and solutions made by redissolving the isolated polymer may be stored for long periods of time in sheet steel containers without undue corrosion.

THE KETONE TREATING AGENT

As set forth hereinabove, the ketone treating agent may be any lower dialkyl ketone or cycloalkanone containing a total of from 3 to 9 carbon atoms. Thus there may be employed acetone, methyl ethyl ketone, diethyl ketone, methyl isopropyl ketone, diisopropyl ketone, dibutyl ketone, diamyl ketone, cyclohexanone and the like.

THE TIME, TEMPERATURE AND MODE OF TREATMENT

The treatment of this invention will effect a significant and worthwhile decrease of the corrosive action of chlorinated elastomers with treatments at from 25° C. to 95° C. when carried out over periods from 2 hours to 24 hours or more. The action progresses to a less extent with lower temperatures and shorter periods of treatment. To compensate for this, the amount of treating agents must be varied as set forth in Table C. It will be understood that the amounts of treating agents calculated to be necessary in accordance with Table A are minimum quantities only, and still greater quantities of any or all of these materials may be used. In general there are no theoretical upper limits to the amounts of treating agents employed.

In some cases, at higher temperatures, the vapor pressure of the solvent will exceed atmospheric, and pressure will be applied to prevent boiling. The usual chlorination solvents, carbon tetrachloride and ethylene dichloride, boil slightly above 75° C., and inasmuch as the reaction proceeds with satisfactory speed and with the use of reasonable amounts of treating agents at this temperature, this will constitute a preferred mode of operation.

Where relatively low temperatures coupled with long treatment times are employed, the solution undergoing treatment should be stirred continuously to insure uniform treatment of the mass.

With the foregoing general discussion in mind, there are given herewith detailed specific examples of the practice of this invention. All parts given are by weight.

EXAMPLE I.—CHLORINATED RUBBER

Chlorinated natural rubber solution (5% solution in carbon tetrachloride, taken direct from the chlorination step during manufacture, hydrogen chloride and excess chlorine having been blown off) __gallons__ 100
Maleic anhydride _____ kg__ .8
Borax _____ kg__ .8
Methyl ethyl ketone _____ kg__ 3.5

The above ingredients were mixed together and heated at 75° C. for four hours. A sample of the heated solution was enclosed in a sealed glass jar with a sheet of carbon steel. Discoloration of the steel indicative of incipient corrosion was first evident after 25 days. A sample of the untreated solution in a similar test produced discoloration in less than 18 hours.

The bulk of the treated solution was then water-precipitated by injection into hot water maintained at 90° C. The solvent was flashed off, leaving the material in the form of spongy granules, which were then dewatered and dried. The dried material was dissolved in toluene to yield a 15% solution. A sample of this solution was enclosed in a sealed glass jar with a sheet of carbon steel. Discoloration of the steel first became perceptible after 100 days. A comparable solution of chlorinated rubber, but prepared without the treatment of this invention, discolored the steel in three days in a similar test.

EXAMPLE II.—CHLORINATED POLYBUTADIENE

Chlorinated polybutadiene solution (in ethylene dichloride, containing 5% of chlorinated polybutadiene; solution taken directly from the chlorination step)
_____ gallons__ 100
Methyl ethyl ketone _____ kg__ 2.5
Maleic anhydride _____ kg__ .8
Borax _____ kg__ .6

The above ingredients were mixed and heated together for 24 hours at 75° C. The solution was then water-precipitated and dried as in the preceding example, and redissolved in toluene to yield a 15% solution. A sample of this solution enclosed in a jar with a carbon steel strip did not produce discoloration of the strip until after 85 days.

EXAMPLE III.—CHLORINATED RUBBER—LOW TEMPERATURE TREATMENT

Chlorinated rubber solution (as in Example I) _____ gallons__ 100
Methyl ethyl ketone _____ kg__ 12.5
Maleic anhydride _____ kg__ 4.0
Borax _____ kg__ 3.0

The above ingredients were mixed together and stored at room temperature for 24 hours. Thereafter the solution was water-precipitated, dried, and redissolved in toluene to yield a 15% solution. A sample of this solution enclosed in a jar with a carbon steel strip did not discolor the strip in 90 days.

EXAMPLE IV.—MISCELLANEOUS CHLORINATED ELASTOMERS

A series of runs was made, using the procedure of Example II, except that in the respective runs, instead of the chlorinated polybutadiene solution, there were employed 5% solutions in ethylene dichloride, of chlorination products of the following elastomeric materials.

*Table IV*

| Elastomer Chlorinated: | Corrosion test (days) |
|---|---|
| Polyisoprene | 80 |
| Copolymer of 75% butadiene, 25% styrene | 80 |
| Copolymer of 80% butadiene, 20% acrylonitrile | 80 |
| Copolymer of 55% butadiene, 45% acrylonitrile | 85 |

The 15% toluene solutions produced from the water-precipitated treated products, when sealed in jars with steel strips, produced discoloration of the strips at the end of the number of days tabulated opposite the elastomers from which the respective products were derived.

From the foregoing general discussion and detailed specific examples, it will be evident that this invention provides a process for producing novel chlorinated elastomer products of greatly reduced corrosive tendencies when in solution. The process employs only minimal quantities of treating agents, which are moreover cheaply and readily available, and may be carried out with a minimum of skilled supervision. The process greatly minimizes the corrosion problems in the later stages of chlorinated elastomer manufacture. Coating compositions containing the novel treated products of this invention may be packaged in metal containers and stored for greatly extended periods of time without undue corrosion of the containers. The anticorrosion properties of the products of this invention are inherent in the products themselves, and do not depend upon the incorporation of special extraneous stabilizing agents.

What is claimed is:

1. Process which comprises incorporating, into 1000 parts by weight of a solution of a chlorinated elastomer selected from the group consisting of those set forth in Table C, the additive ingredients

| | Parts by weight |
|---|---|
| Maleic anhydride | at least 1 |
| A lower alkyl ketone containing 3-9 carbon atoms | at least 4 |
| Borax | at least 1 | and thereafter heating the solution at a selected temperature between 25° C. and 90° C. for a selected time of at least two hours, with the proviso that the minimum quantities of said additive ingredients are to be multiplied by the factor F tabulated in Table B for the selected temperature and time.

2. Process which comprises incorporating, into 1000 parts by weight of a solution of chlorinated rubber, the additive ingredients

| | Parts by weight |
|---|---|
| Maleic anhydride | at least 1 |
| A lower alkyl ketone containing 3-9 carbon atoms | at least 4 |
| Borax | at least 1 | and thereafter heating the solution at a selected temperature between 25° C. and 90° C. for a selected time of at least two hours, with the proviso that the minimum quantities of said additive ingredients are to be multiplied by the factor F tabulated in Table B for the selected temperature and time.

3. Process which comprises incorporating, into 1000 parts by weight of a solution of a chlorinated polybutadiene, the additive ingredients

| | Parts by weight |
|---|---|
| Maleic anhydride | at least 1 |
| A lower alkyl ketone containing 3-9 carbon atoms | at least 4 |
| Borax | at least 1 | and thereafter heating the solution at a selected temperature between 25° C. and 90° C. for a selected time of at least two hours, with the proviso that the minimum quantities of said additive ingredients are to be multiplied by the factor F tabulated in Table B for the selected temperature and time.

4. Process which comprises incorporating, into 1000 parts by weight of a solution, in the chlorination solvent in which it was produced, of a chlorinated elastomer selected from the group consisting of those set forth in Table C, the additive ingredients

| | Parts by weight |
|---|---|
| Maleic anhydride | at least 1 |
| A lower alkyl ketone containing 3-9 carbon atoms | at least 4 |
| Borax | at least 1 | and thereafter heating the solution at a selected temperature between 25° C. and 90° C. for a selected time of at least two hours, with the proviso that the minimum quantities of said additive ingredients are to be multiplied by the factor F tabulated in Table B for the selected temperature and time.

5. Process which comprises incorporating, into 1000 parts by weight of a solution, in carbon tetrachloride, of a chlorinated elastomer selected from the group consisting of those set forth in Table C the additive ingredients

| | Parts by weight |
|---|---|
| Maleic anhydride | at least 1 |
| A lower alkyl ketone containing 3-9 carbon atoms | at least 4 |
| Borax | at least 1 | and thereafter heating the solution at a selected temperature between 25° C. and 90° C. for a selected time of at least two hours, with the proviso that the minimum quantities of said additive ingredients are to be multiplied by the factor F tabulated in Table B for the selected temperature and time.

6. Process which comprises incorporating, into 1000 parts by weight of a solution, in carbon tetrachloride, of chlorinated rubber, the additive ingredients

| | Parts by weight |
|---|---|
| Maleic anhydride | at least 1 |
| A lower alkyl ketone containing 3-9 carbon atoms | at least 4 |
| Borax | at least 1 | and thereafter heating the solution at a selected temperature between 25° C. and 90° C. for a selected time of at least two hours, with the proviso that the minimum quantities of said additive ingredients are to be multiplied by the factor F tabulated in Table B for the selected temperature and time.

7. Process which comprises incorporating, into 1000 parts by weight of a solution, in ethylene dichloride, of a chlorinated elastomer selected from the group consisting of those set forth in Table C, the additive ingredients

| | Parts by weight |
|---|---|
| Maleic anhydride | at least 1 |
| A lower alkyl ketone containing 3-9 carbon atoms | at least 4 |
| Borax | at least 1 | and thereafter heating the solution at a selected temperature between 25° C. and 90° C. for a selected time of at least two hours, with the proviso that the minimum quantities of said additive ingredients are to be multiplied by the factor F tabulated in Table B for the selected temperature and time.

8. Process which comprises incorporating, into 1000 parts by weight of a solution, in ethylene dichloride, of chlorinated polybutadiene, the additive ingredients

| | Parts by weight |
|---|---|
| Maleic anhydride | at least 1 |
| A lower alkyl ketone containing 3-9 carbon atoms | at least 4 |
| Borax | at least 1 | and thereafter heating the solution at a selected temperature between 25° C. and 90° C. for a selected time of at least two hours, with the proviso that the minimum quantities of said additive ingredients are to be multiplied by the factor F tabulated in Table B for the selected temperature and time.

9. A chlorinated elastomer selected from the group consisting of those set forth in Table C, said chlorinated elastomer being characterized by the non-corrosiveness to metals of its solutions, and said chlorinated elastomer having been prepared by the process set forth in claim 1.

10. A chlorinated rubber characterized by the noncorrosiveness to metals of its solutions, said chlorinated rubber having been prepared by the process of claim 2.

11. A chlorinated polybutadiene characterized by the non-corrosiveness to metals of its solutions, said chlorinated polybutadiene having been prepared by the process of claim 3.

ELIZABETH M. BEHREND.

REFERENCES CITED

The following references are of record in the file of this patent:

UNITED STATES PATENTS

| Number | Name | Date |
|---|---|---|
| 2,316,196 | Tucker | Apr. 13, 1943 |